(12) United States Patent
Zhang et al.

(10) Patent No.: US 12,550,222 B2
(45) Date of Patent: Feb. 10, 2026

(54) UNICAST-MULTICAST CONVERSION METHOD AND DEVICE, AND PROCESSOR READABLE STORAGE MEDIUM

(71) Applicant: DATANG MOBILE COMMUNICATIONS EQUIPMENT CO., LTD., Beijing (CN)

(72) Inventors: Dajun Zhang, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 392 days.

(21) Appl. No.: 18/020,052

(22) PCT Filed: Jun. 7, 2021

(86) PCT No.: PCT/CN2021/098714
§ 371 (c)(1),
(2) Date: Feb. 6, 2023

(87) PCT Pub. No.: WO2022/028086
PCT Pub. Date: Feb. 10, 2022

(65) Prior Publication Data
US 2024/0098831 A1  Mar. 21, 2024

(30) Foreign Application Priority Data
Aug. 4, 2020 (CN) .......................... 202010774630.X

(51) Int. Cl.
*H04W 76/27* (2018.01)
*H04L 12/18* (2006.01)

(52) U.S. Cl.
CPC ......... *H04W 76/27* (2018.02); *H04L 12/1881* (2013.01); *H04L 12/189* (2013.01)

(58) Field of Classification Search
None
See application file for complete search history.

(56) References Cited

U.S. PATENT DOCUMENTS 10,129,710 B2 * 11/2018 Lee ................. H04W 72/30
10,686,558 B1   6/2020 Kodaypak et al.
(Continued)

FOREIGN PATENT DOCUMENTS

CN   101170466 A   4/2008
CN   101170724 A   4/2008
(Continued)

OTHER PUBLICATIONS

Extended European Search Report for the corresponding European Patent Application No. 21852286.0 issued by the European Patent Office on Jan. 3, 2024.
(Continued)

*Primary Examiner* — Otis L Thompson, Jr.
(74) *Attorney, Agent, or Firm* — Ladas & Parry, LLP

(57) ABSTRACT

Embodiments of the present application provide a unicast multicast conversion method and apparatus, and a processor-readable storage medium, wherein the unicast multicast conversion method comprises: receiving a Radio Resource Control (RRC) reconfiguration message sent by a first network node, when Multimedia Broadcast Multicast Service (MBMS) service data packets sent by the first network node are received through a multicast bearer and a User Equipment (UE) is in a connected state; reconstructing an MBMS Packet Data Convergence Protocol (MBMS PDCP) entity according to the RRC reconfiguration message; sending a reconfiguration completion message to the first network node so that the first network node converts the multicast bearer to a unicast bearer and sends the MBMS service data packets to the UE through the unicast bearer, the reconfiguration completion message being configured to
(Continued)

characterize that reconstruction of the MBMS PDCP entity is accomplished by the UE; and receiving the MBMS service data packets sent by the first network node through the unicast bearer. The method realizes the conversion of the UE from receiving the MBMS service data packets through the multicast bearer to receiving the MBMS service data packets through the unicast bearer, thereby ensuring that no data packets are lost.

23 Claims, 9 Drawing Sheets

(56) References Cited

U.S. PATENT DOCUMENTS

| | | | | |
|---|---|---|---|---|
| 12,284,043 | B2* | 4/2025 | Pelletier | H04L 1/1854 |
| 2011/0216688 | A1* | 9/2011 | Katori | H04W 72/30 |
| | | | | 370/312 |
| 2013/0268986 | A1* | 10/2013 | Venkatachalam | H04B 7/0482 |
| | | | | 725/109 |
| 2014/0372624 | A1* | 12/2014 | Wang | H04L 65/60 |
| | | | | 709/231 |
| 2015/0071157 | A1* | 3/2015 | Jung | H04W 36/0007 |
| | | | | 370/312 |
| 2015/0078245 | A1* | 3/2015 | Anchan | H04W 36/0007 |
| | | | | 370/312 |
| 2016/0227383 | A1 | 8/2016 | Lin | |
| 2018/0160342 | A1* | 6/2018 | Park | H04W 36/0033 |
| 2019/0075494 | A1* | 3/2019 | Mackenzie | H04W 28/0273 |
| 2020/0344515 | A1* | 10/2020 | Wong | H04N 21/42221 |
| 2021/0068004 | A1* | 3/2021 | Kadiri | H04L 47/15 |
| 2021/0076164 | A1* | 3/2021 | Navratil | H04W 4/06 |
| 2021/0076165 | A1* | 3/2021 | Li | H04L 1/1642 |
| 2021/0185566 | A1* | 6/2021 | Zhu | H04W 4/70 |
| 2021/0352444 | A1* | 11/2021 | Griot | H04W 28/0268 |
| 2021/0378053 | A1* | 12/2021 | Saily | H04W 76/40 |
| 2022/0150997 | A1* | 5/2022 | Xu | H04W 4/06 |
| 2022/0353642 | A1* | 11/2022 | Wang | H04W 76/40 |
| 2023/0110505 | A1* | 4/2023 | Wang | H04L 1/08 |
| | | | | 370/331 |
| 2023/0345310 | A1* | 10/2023 | Li | H04W 4/06 |
| 2023/0354106 | A1* | 11/2023 | Godin | H04W 76/40 |

FOREIGN PATENT DOCUMENTS

| | | |
|---|---|---|
| CN | 109982266 | 7/2019 |
| CN | 110809299 | 2/2020 |
| CN | 111901765 | 11/2020 |
| GB | 2552705 | 2/2018 |
| KR | 20170113755 A | 10/2017 |
| WO | 2015096736 A1 | 7/2015 |
| WO | 2016029938 A1 | 3/2016 |
| WO | 2020035795 A1 | 2/2020 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 14), 3GPP TS 36.300 V14.2.0 (Mar. 2017).

"RAN Logical Architecture and Interfaces for 5G-Xcast," Deliverable D3.3, Broadcast and Multicast Communication Enablers for the Fifth-Generation of Wireless Systems, version v2.0, Feb. 28, 2019.

International Search Report for PCT/CN2021/098714 mailed on Sep. 1, 2021 and its English translation provided by WIPO.

Written Opinion of the International Searching Authority for PCT/CN2021/098714 mailed on Sep. 1, 2021 and its English translation provided by WIPO.

TCL Communication Ltd., "Radio Bearer based Multicast PTM and PTP mode switching, R2-2006569", 3GPP TSG-RAN WG2 #111e, Aug. 7, 2020, all pages.

CATT, "Discussion on Dynamic PTM and PTP Switch with Service Continuity, R2-2006594" , 3GPP TSG-RAN WG2 Meeting #111, Aug. 7, 2020, all pages.

Huawei, HiSilicon, "Wid revision: NR Multicast and Broadcast Services, RP-201038", 3GPP TSG RAN Meeting #88-e, Jun. 22, 2020, all pages.

Qualcomm Incorporated, "Solution to KI # 7: Mobility between 5G MBS supporting and 5G MBS, S2-2004223", SA WG2 Meeting #139E, May 22, 2020, all pages.

First Chinese Office Action for the corresponding Chinese Patent Application No. 202210974829.6 issued on Jul. 1, 2023 and its machine translation by Google.

\* cited by examiner

UNICAST-MULTICAST CONVERSION METHOD AND DEVICE, AND PROCESSOR READABLE STORAGE MEDIUM

CROSS-REFERENCE TO RELATED APPLICATIONS

The present application is a U.S. National Phase Application of PCT/CN2021/098714, which is based on and claims priority to Chinese Patent Application No. 202010774630.X, filed on Aug. 4, 2020, in the China National Intellectual Property Administration, entitled "UNICAST MULTICAST CONVERSION METHOD AND APPARATUS, AND PROCESSOR-READABLE STORAGE MEDIUM," the disclosures of which are incorporated herein by reference in their entireties.

TECHNICAL FIELD

The present application relates to wireless communication technology, and specifically, to a unicast multicast conversion method and apparatus, and a processor-readable storage medium.

BACKGROUND

In the prior art, the 4G Multimedia Broadcast Multicast Service (MBMS) technology only allows a core network to initiate mode conversion of receiving MBMS service data packets according to feedback from a User Equipment (UE) and configured strategies, while this kind of mode conversion involves many complex signaling procedures and cannot dynamically and efficiently solve the problem of utilization efficiency of network resources. For example, in Single Cell-Point To Multipoint (SC-PTM) mode signaling flow of the 4G MBMS, the UE needs to read Single Cell-Multicast Common Control Channel (SC-MCCH) information, to obtain scheduling information of Single Cell-Multicast Traffic Control Channel (SC-MTCH), and can receive the MBMS service data packets in idle or connected state. For another example, the MBMS service data packets are received in unicast mode, and unicast transmission of the MBMS service data packets can only be accomplished by a traditional unicast Protocol Data Unit (PDU) session establishment procedure.

5G NR (New Radio), as a new generation of wireless access technology network, also has a demand for multimedia multicast broadcast services. How to realize the conversion of the UE from receiving the MBMS service data packets through a multicast bearer to receiving the MBMS service data packets through a unicast bearer is an issue to be solved.

SUMMARY

The present application provides a unicast multicast conversion method and apparatus, and a processor-readable storage medium.

In a first aspect, an embodiment of the present application provides a unicast multicast conversion method, applied to a User Equipment (UE), comprising:

receiving a Radio Resource Control (RRC) reconfiguration message sent by a first network node, when Multimedia Broadcast Multicast Service (MBMS) service data packets sent by the first network node are received through a multicast bearer and the UE is in a connected state;

Reconstructing an MBMS Packet Data Convergence Protocol (MBMS PDCP) entity according to the RRC reconfiguration message;

sending a reconfiguration completion message to the first network node so that the first network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the first network node through the unicast bearer.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, reconstructing the MBMS PDCP entity according to the RRC reconfiguration message comprises:

constructing data packets that are not received by the UE of multicast PDCP Protocol Data Units (PDUs) according to the RRC reconfiguration message; and storing disordered Service Data Units (SDUs) of a multicast PDCP buffer to a unicast PDCP buffer reconstructed by the UE.

Optionally, if the MBMS service data packets sent by the first network node that are received through the unicast bearer include the corresponding PDCP PDUs, the method further comprises:

processing, via a unicast key and/or a unicast compression mode, the PDCP PDUs corresponding to the MBMS service data packets sent by the first network node through the unicast bearer to obtain the PDCP SDUs.

Optionally, the RRC reconfiguration message includes a bearer conversion indication, which is configured to implicitly indicate to perform the conversion of the multicast bearer to the unicast bearer by configuring a configuration relationship of mapping from an MBMS session to the DRB, or to carry explicit information indicating to perform the conversion of the multicast bearer to the unicast bearer.

In a second aspect, an embodiment of the present application provides a unicast multicast conversion method, applied to a first network node, comprising:

sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

Optionally, before sending the RRC reconfiguration message to the UE, the method further comprises:

acquiring first information; and determining to convert the multicast bearer to the unicast bearer based on the first information, the first information including at least one of the following: the number of UEs, bearer conditions of UEs, and reception status of the MBMS service data packets of UEs, the UE being a UE that receives the MBMS service data packet sent by the first network node.

Optionally, the reconfiguration completion message includes data packets that are not received by the UE.

Optionally, before sending the MBMS service data packets to the UE through the unicast bearer, the method further comprises:

Data Units (SDUs) corresponding to the MBMS service data packets sent through the unicast bearer to obtain PDCP Protocol Data Units (PDUs);

the sending the MBMS service data packets to the UE through the unicast bearer comprises:

sending the PDCP PDUs to the UE through the unicast bearer.

Optionally, sending the RRC reconfiguration message to the UE includes at least one of the following:

sending the RRC reconfiguration message to the UE via an RRC signaling;

sending the RRC reconfiguration message to the UE via a PDCP control signaling;

sending the RRC reconfiguration message to the UE via a Media Access Control Control Element (MAC CE); and sending the RRC reconfiguration message to the UE via a control signaling of a physical layer;

wherein the RRC reconfiguration message comprises a bearer conversion indication.

In a third aspect, an embodiment of the present application provides a unicast multicast conversion method, applied to a User Equipment (UE), comprising:

switching from a second network node to a third network node, when Multimedia Broadcast Multicast Service (MBMS) service data packets sent by the second network node are received through a multicast bearer and the UE is in a connected state;

receiving an RRC reconfiguration message sent by the third network node;

reconstructing an MBMS Packet Data Convergence Protocol (MBMS PDCP) entity according to the RRC reconfiguration message;

sending a reconfiguration completion message to the third network node so that the third network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the third network node through the unicast bearer.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, the second network node and the third network node are at least one Distributed Unit (DU) in the same base station, the at least one DU corresponds to at least one cell; or the second network node and the third network node are different base stations.

In a fourth aspect, an embodiment of the present application provides a unicast multicast conversion method, applied to a third network node, wherein the method comprises:

sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

Optionally, before sending the RRC reconfiguration message to the UE, the method further comprises:

acquiring second information; and determining to convert the multicast bearer to the unicast bearer based on the second information, the second information including at least one of the following: the number of UEs, bearer conditions of UEs, and reception status of the MBMS service data packets of UEs, the UE being a UE that receives the MBMS service data packet sent by the third network node.

In a fifth aspect, an embodiment of the present application provides a unicast multicast conversion apparatus, applied to a User Equipment (UE), comprising a memory, a transceiver, and a processor:

the memory is configured to store a computer program; the transceiver is configured to send and receive data under the control of the processor; the processor is configured to read the computer program in the memory and perform the following actions:

receiving a Radio Resource Control (RRC) reconfiguration message sent by a first network node, when Multimedia Broadcast Multicast Service (MBMS) service data packets sent by the first network node are received through a multicast bearer and the UE is in a connected state;

reconstructing an MBMS Packet Data Convergence Protocol (MBMS PDCP) entity according to the RRC reconfiguration message;

sending a reconfiguration completion message to the first network node so that the first network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the first network node through the unicast bearer.

In a sixth aspect, an embodiment of the present application provides a unicast multicast conversion apparatus, applied to a first network node, comprising a memory, a transceiver, and a processor:

the memory is configured to store a computer program; the transceiver is configured to send and receive data under the control of the processor; the processor is configured to read the computer program in the memory and perform the following actions:

sending MBMS service data packets to a User Equipment (UE) in a connected state through a multicast bearer, and sending an RRC reconfiguration message to the UE so that the UE reconstructs an MBMS PDCP entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

In a seventh aspect, an embodiment of the present application provides a unicast multicast conversion apparatus, applied to a User Equipment (UE), comprising a memory, a transceiver, and a processor:

the memory is configured to store a computer program; the transceiver is configured to send and receive data under the control of the processor; the processor is configured to read the computer program in the memory and perform the following actions: switching from a second network node to a third network node, when Multimedia are received through a multicast bearer and the UE is in a connected state;

receiving an RRC reconfiguration message sent by the third network node;

reconstructing an MBMS Packet Data Convergence Protocol (MBMS PDCP) entity according to the RRC reconfiguration message;

sending a reconfiguration completion message to the third network node so that the third network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the third network node through the unicast bearer.

In an eighth aspect, an embodiment of the present application provides a unicast multicast conversion apparatus, applied to a third network node, comprising a memory, a transceiver, and a processor:

the memory is configured to store a computer program; the transceiver is configured to send and receive data under the control of the processor; the processor is configured to read the computer program in the memory and perform the following actions:

sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

In a ninth aspect, an embodiment of the present application provides a unicast multicast conversion apparatus, applied to a User Equipment (UE), comprising:

a first processing unit configured to receive a Radio Resource Control (RRC) reconfiguration message sent by a first network node, when Multimedia Broadcast Multicast Service (MBMS) service data packets sent by the first network node are received through a multicast bearer and the UE is in a connected state;

a second processing unit configured to reconstruct an MBMS Packet Data Convergence Protocol (MBMS PDCP) entity according to the RRC reconfiguration message;

a third processing unit configured to send a reconfiguration completion message to the first network node so that the first network node converts the multicast bearer to a unicast bearer, and sends the MBMS service data packets to the UE through the unicast bearer, the reconfiguration completion message being configured to characterize that reconstruction of the MBMS PDCP entity is accomplished by the UE; and a fourth processing unit configured to receive the MBMS service data packets sent by the first network node through the unicast bearer.

In a tenth aspect, an embodiment of the present application provides a unicast multicast conversion apparatus, applied to a first network node, comprising:

a fifth processing unit configured to send a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

a sixth processing unit configured to receive a reconfiguration completion message sent by the UE, the reconfiguration completion message being configured to characterize that reconstruction of the MBMS PDCP entity is accomplished by the UE;

a seventh processing unit configured to reconstruct a unicast PDCP entity according to the reconfiguration completion message, and convert a multicast bearer to a unicast bearer; and an eighth processing unit configured to send the MBMS service data packets to the UE through the unicast bearer.

In an eleventh aspect, an embodiment of the present application provides a unicast multicast conversion apparatus, applied to a User Equipment (UE), comprising:

a ninth processing unit configured to switch from a second network node to a third network node, when Multimedia Broadcast Multicast Service (MBMS) service data packets sent by the second network node are received through a multicast bearer and the UE is in a connected state;

a tenth processing unit configured to receive a Radio Resource Control (RRC) reconfiguration message sent by the third network node;

an eleventh processing unit configured to reconstruct an MBMS Packet Data Convergence Protocol (MBMS PDCP) entity according to the RRC reconfiguration message;

a twelfth processing unit configured to send a reconfiguration completion message to the third network node so that the third network node converts the multicast bearer to a unicast bearer, and sends the MBMS service data packets to the UE through the unicast bearer, the reconfiguration completion message being configured to characterize that reconstruction of the MBMS PDCP entity is accomplished by the UE; and a thirteenth processing unit configured to receive the MBMS service data packets sent by the third network node through the unicast bearer.

In a twelfth aspect, an embodiment of the present application provides a unicast multicast conversion apparatus, applied to a third network node, comprising:

a fourteenth processing unit configured to send a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

a fifteenth processing unit configured to receive a reconfiguration completion message sent by the UE, the reconfiguration completion message being configured to characterize that reconstruction of the MBMS PDCP entity is accomplished by the UE;

a sixteenth processing unit configured to reconstruct a unicast PDCP entity according to the reconfiguration completion message, and to convert a multicast bearer to a unicast bearer; and a seventeenth processing unit configured to send the MBMS service data packets to the UE through the unicast bearer.

In a thirteenth aspect, an embodiment of the present application provides a processor-readable storage medium having stored therein a computer program that, when executed by a processor, causes the processor to perform the method described in the first, second, third, and fourth aspects.

Additional aspects and advantages of the present application will be given in part in the description which follows and, will be apparent from the following description, or may be learned by practice of the present application.

BRIEF DESCRIPTION OF THE DRAWINGS

In order to illustrate the technical solution more clearly in embodiments of the present application, the accompanying drawings needed in the description of the embodiments of the present application will be briefly described below.

DETAILED DESCRIPTION

Figure 1:
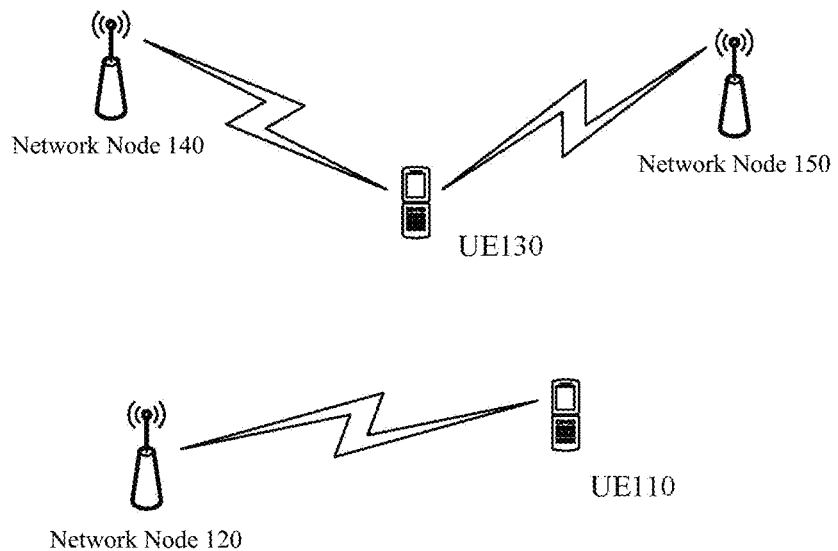
FIG. 1 is a schematic diagram of a system architecture according to an embodiment of the present application.

Embodiments of the present application are described in detail below, and examples of said embodiments are shown in the accompanying drawings, where the same or similar numerals indicate the same or similar elements or elements having the same or similar functions throughout. The embodiments described below by reference to the accompanying drawings are exemplary, and are merely intended to explain the present application and not to be construed as a limitation on the present application.

It may be understood by those skilled in the art that, unless specifically stated, the singular forms "a", "one", "said" and "the" as used herein may also include the plural forms. It is to be further understood that the phrasing "comprising" as used in the specification of the present application specifies the presence of the stated features, integers, steps, actions, elements and/or components, but does not preclude the presence or addition of one or more other features, integers, steps, actions, elements, components and/or groups thereof. It should be understood that, when we say that an element is "connected" or "coupled" to the other element, it may be directly connected or coupled to the other element, or there may be intermediate elements. Additionally, "connected" or "coupled" as used herein may include wirelessly connected or wirelessly coupled. The phrasing "and/or" as used herein includes any or all combinations of one or more of the associated listed items.

The term "and/or" in embodiments of the present application describes the association of associated objects and indicates that three relationships may exist, e.g., A and/or B, which may indicate the presence of A alone, both A and B, and B alone. The character "I" generally indicates an "or" relationship between the associated objects before and after. The term "a plurality of" in the embodiments of the present application refers to two or more, and other quantifiers are similar.

The technical solution according to the embodiments of the present application may be applied to a variety of systems, especially 5G systems. For example, the applicable systems may be a Global System for Mobile Communications (GSM) system, a Code Division Multiple Access (CDMA) system, a Wideband Code Division Multiple Access (WCDMA)/General Packet Radio Services (GPRS) system, a Long Term Evolution (LTE) system, an LTE Frequency Division Duplex (FDD) system, an LTE Time Division Duplex (TDD) system, a Long Term Evolution-Advanced (LTE-A) system, a Universal Mobile Telecommunications System (UMTS), a Worldwide Interoperability for Microwave Access (WiMAX) system, a 5G New Radio (NR) system, etc. These various systems each include terminal and network devices. The system may also include a core network part, such as an Evolved Packet System (EPS), a 5G system (5GS), etc.

The technical solution in the embodiments of the present application will be clearly and completely described below in conjunction with the accompanying drawings in the embodiments of the present application. Obviously, the described embodiments are merely a part of the embodiments of the present application, and not all of them. Based on the embodiments in the present application, all other embodiments obtained by a person of ordinary skill in the art without making creative labor fall within the scope of protection of the present application.

A schematic diagram of a network architecture according to an embodiment of the present application is shown in FIG. 1, the network architecture includes: a UE and network nodes, wherein the UE is, for example, UE110 and UE130 in FIG. 1, the network nodes are, for example, network node 120, network node 140 and network node 150 in FIG. 1. The network nodes are deployed in an access network, e.g., network node 120, network node 140 and network node 150 are deployed in an access network NG-RAN (Next Generation Radio Access Network) in a 5G system. The UE and the network nodes communicate with each other by some air interface technology, e.g., they may communicate with each other by cellular technology.

The UE involved in embodiments of the present application may be devices that provide voice and/or data connectivity to users, handheld devices with wireless connectivity, or other processing devices connected to a wireless modem, etc. The types of UEs include cell phones, vehicle user terminals, tablets, laptops, personal digital assistants, mobile internet devices, wearable devices, etc.

The network nodes involved in embodiments of the present application may be a base station, which may include a plurality of cells that provide services to the UE. Depending on the specific application, the base station may also be referred to as an access point, or may be a device in the access network that communicates with the UE over one or more sectors on an air interface, or other names. The network nodes may be used to interchange the received air frames with Internet Protocol (IP) packets, acting as a router between the UE and the rest of the access network, where the rest of the access network may include an Internet Protocol (IP) communication network. The network nodes may also coordinate the management of attributes of the air interface.

For example, the network nodes involved in embodiments of the present application may be a network device (BTS) in Global System for Mobile Communications (GSM) or Code Division Multiple Access (CDMA), a network device (NodeB) in Wideband Code Division Multiple Access (WCDMA), or an evolved network device (evolved Node B, eNB or e-NodeB) in Long Term Evolution (LTE) system, a 5G base station (gNB) in a 5G network architecture (next generation system), or a Home evolved Node B (HeNB), a relay node, a home base station (femto), a pico base station (pico), etc., which are not limited in embodiments of the present application. In some network structures, the network nodes may include centralized unit (CU) nodes and distributed unit (DU) nodes, and the centralized units and distributed units may also be geographically separately arranged.

Figure 2:
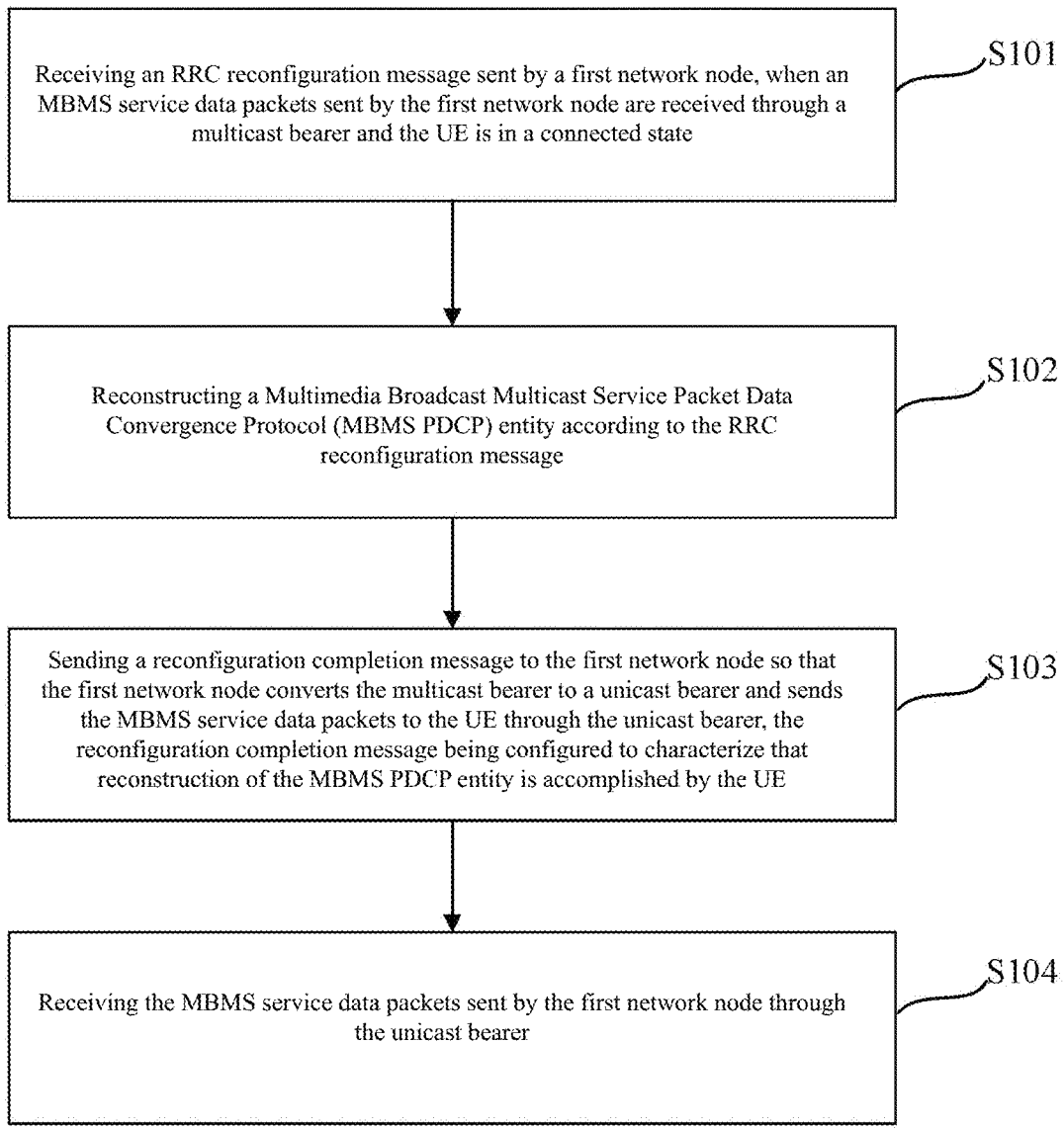
FIG. 2 is a schematic diagram of a flow of a unicast multicast conversion method according to an embodiment of the present application.

In an embodiment of the present application, there is provided a unicast multicast conversion method, applied to a User Equipment (UE), and a schematic diagram of a flow of the method is shown in FIG. 2, the method comprises:

Step S101: Receiving a Radio Resource Control (RRC) reconfiguration message sent by a first network node, when Multimedia Broadcast Multicast Service (MBMS) service data packets sent by the first network node are received through a multicast bearer and the UE is in a connected state.

Optionally, the UE is UE110 in FIG. 1 and the first network node is network node 120 in FIG. 1.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, the RRC reconfiguration message includes a bearer conversion indication, which is configured to implicitly indicate to perform the conversion of the multicast bearer to the unicast bearer by configuring a configuration relationship of mapping from an MBMS session to the DRB, or to carry explicit information indicating to perform the conversion of the multicast bearer to the unicast bearer.

Step S102: Reconstructing an MBMS Packet Data Convergence Protocol (MBMS PDCP) entity according to the RRC reconfiguration message.

Optionally, reconstructing the MBMS PDCP entity according to the RRC reconfiguration message comprises:

constructing data packets that are not received by the UE of multicast PDCP Protocol Data Units (PDUs) according to the RRC reconfiguration message; and storing disordered Service Data Units (SDUs) of a multicast PDCP buffer to a unicast PDCP buffer reconstructed by the UE.

Step S103: Sending a reconfiguration completion message to the first network node so that the first network node converts the multicast bearer to a unicast bearer and sends the MBMS service data packets to the UE through the unicast bearer, the reconfiguration completion message being configured to characterize that reconstruction of the MBMS PDCP entity is accomplished by the UE.

Step S104: Receiving the MBMS service data packets sent by the first network node through the unicast bearer.

Optionally, when the MBMS service data packets sent by the first network node that are received through the unicast bearer include the corresponding PDCP PDUs, the method further comprises:

processing, via a unicast key and/or a unicast compression mode, the PDCP PDUs corresponding to the MBMS service data packets sent by the first network node through the unicast bearer to obtain the PDCP SDUs.

The technical solution according to embodiments of the present application has at least the following beneficial effects:

Within the same network node, the UE is realized to convert from receiving the MBMS service data packets through the multicast bearer to receiving the MBMS service data packets through the unicast bearer, and to ensure that no data packets are lost, thereby improving the utilization efficiency of network resources.

Figure 3:
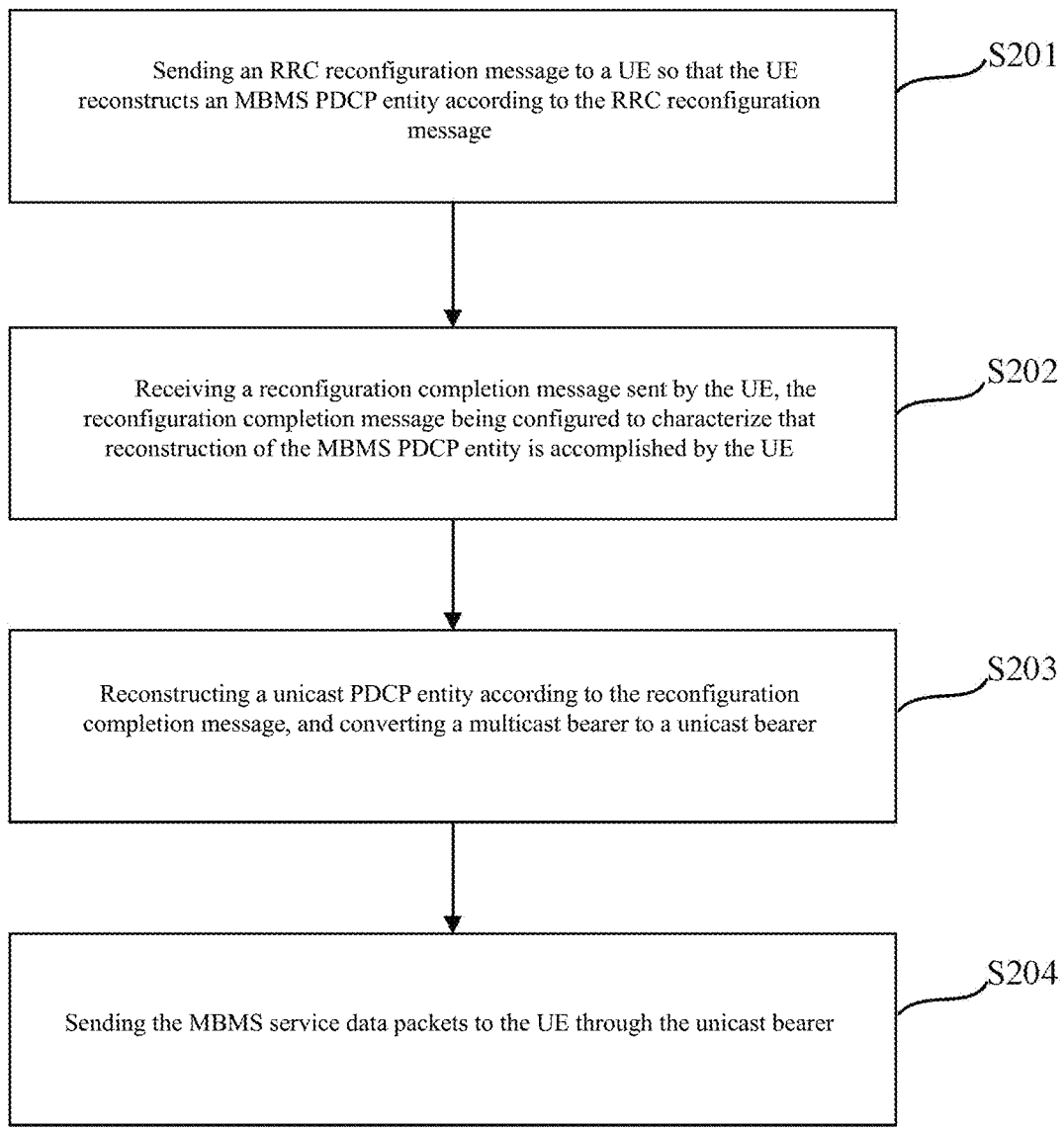
FIG. 3 is a schematic diagram of a flow of another unicast multicast conversion method according to an embodiment of the present application.

In an embodiment of the present application, there is provided another unicast multicast conversion method, applied to a first network node, and a schematic diagram of a flow of the method is shown in FIG. 3, the method comprises:

Step S201: Sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

Optionally, MBMS service data packets are sent to the UE in a connected state through a multicast bearer and an RRC reconfiguration message is sent to the UE so that the UE reconstructs an MBMS PDCP entity according to the RRC reconfiguration message.

Step S202: Receiving a reconfiguration completion message sent by the UE, the reconfiguration completion message is configured to characterize that reconstruction of the MBMS PDCP entity is accomplished by the UE.

Step S203: Reconstructing a unicast PDCP entity according to the reconfiguration completion message, and converting a multicast bearer to a unicast bearer.

Step S204: Sending the MBMS service data packets to the UE through the unicast bearer.

Optionally, before sending the RRC reconfiguration message to the UE, the method further comprises:
acquiring first information; and
determining to convert the multicast bearer to the unicast bearer based on the first information, the first information including at least one of the following: the number of UEs, bearer conditions of UEs, and reception status of the MBMS service data packets of UEs, the UE being a UE that receives the MBMS service data packet sent by the first network node.

Optionally, the reconfiguration completion message includes data packets that are not received by the UE.

Optionally, before sending the MBMS service data packets to the UE through the unicast bearer, the method further comprises:

processing, via a unicast key and/or a unicast compression mode, PDCP Service Data Units (SDUs) corresponding to the MBMS service data packets sent through the unicast bearer to obtain PDCP Protocol Data Units (PDUs);

sending the MBMS service data packets to the UE through the unicast bearer comprises:
sending the PDCP PDUs to the UE through the unicast bearer.

Optionally, sending the RRC reconfiguration message to the UE includes at least one of the following:
sending the RRC reconfiguration message to the UE via an RRC signaling;
sending the RRC reconfiguration message to the UE via a PDCP control signaling;
sending the RRC reconfiguration message to the UE via a Media Access Control Control Element (MAC CE); and
sending the RRC reconfiguration message to the UE via a control signaling of a physical layer;
wherein the RRC reconfiguration message comprises a bearer conversion indication.

The technical solution according to embodiments of the present application has at least the following beneficial effects:

Within the same network node, the UE is realized to convert from receiving the MBMS service data packets through the multicast bearer to receiving the MBMS service data packets through the unicast bearer, and to ensure that no data packets are lost, thereby improving the utilization efficiency of network resources.

Figure 4:
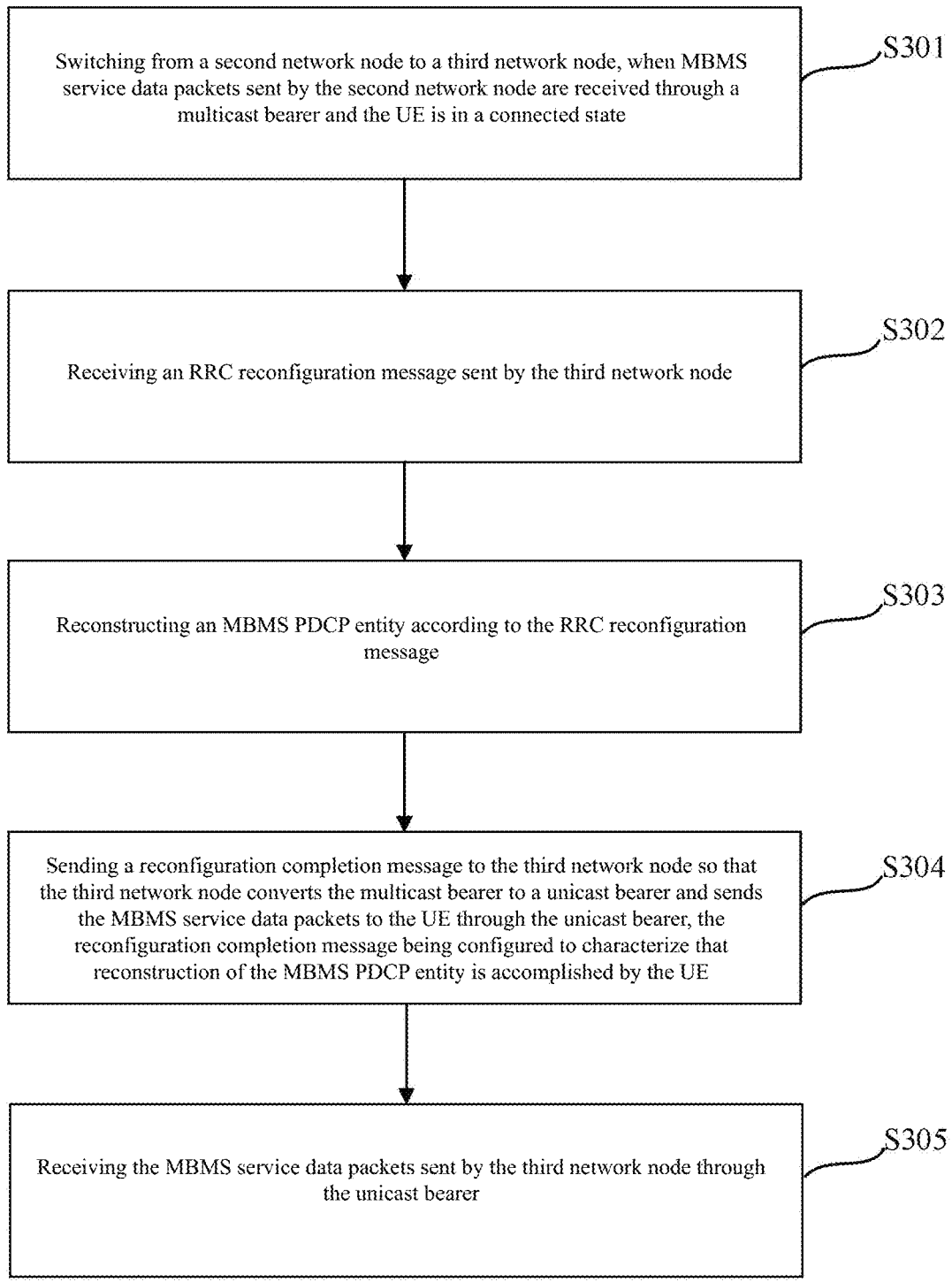
FIG. 4 is a schematic diagram of a flow of yet another unicast multicast conversion method according to an embodiment of the present application.

In an embodiment of the present application, there is provided yet another unicast multicast conversion method, applied to a User Equipment (UE), and a schematic diagram of a flow of the method is shown in FIG. 4, the method comprises:

Step S301: Switching from a second network node to a third network node, when Multimedia Broadcast Multicast Service (MBMS) service data packets sent by the second network node are received through a multicast bearer and the UE is in a connected state.

Optionally, the UE is UE130 in FIG. 1, and the second network node and the third network node are network node 140 and network node 150 in FIG. 1, respectively.

Optionally, the second network node and the third network node are at least one Distributed Unit (DU) in the same base station, the at least one DU corresponds to at least one cell; or the second network node and the third network node are different base stations.

Step S302: Receiving a Radio Resource Control (RRC) reconfiguration message sent by the third network node.

Optionally, the configuration of the RRC reconfiguration message includes at least one of the following:
the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;
the RRC reconfiguration message includes DRB configuration information and MRB configuration information, the DRB corresponding to the DRB configuration information is in an active state, and the MRB corresponding to the MRB configuration information is in an inactive state; and
the RRC reconfiguration message includes DRB configuration information and MRB configuration information, the DRB corresponding to the DRB configuration information is in an inactive state, and the MRB corresponding to the MRB configuration information is in an active state.

Step S303: Reconstructing an MBMS Packet Data Convergence Protocol (MBMS PDCP) entity according to the RRC reconfiguration message.

Step S304: Sending a reconfiguration completion message to the third network node so that the third network node converts the multicast bearer to a unicast bearer and sends the MBMS service data packets to the UE through the unicast bearer, the reconfiguration completion message being configured to characterize that reconstruction of the MBMS PDCP entity is accomplished by the UE.

Step S305: Receiving the MBMS service data packets sent by the third network node through the unicast bearer.

The technical solution according to embodiments of the present application has at least the following beneficial effects:

When the UE switches from the second network node to the third network node, the UE is realized to convert from receiving the MBMS service data packets through the multicast bearer to receiving the MBMS service data packets through the unicast bearer, and to ensure that no data packets are lost, thereby improving the utilization efficiency of network resources.

Figure 5:
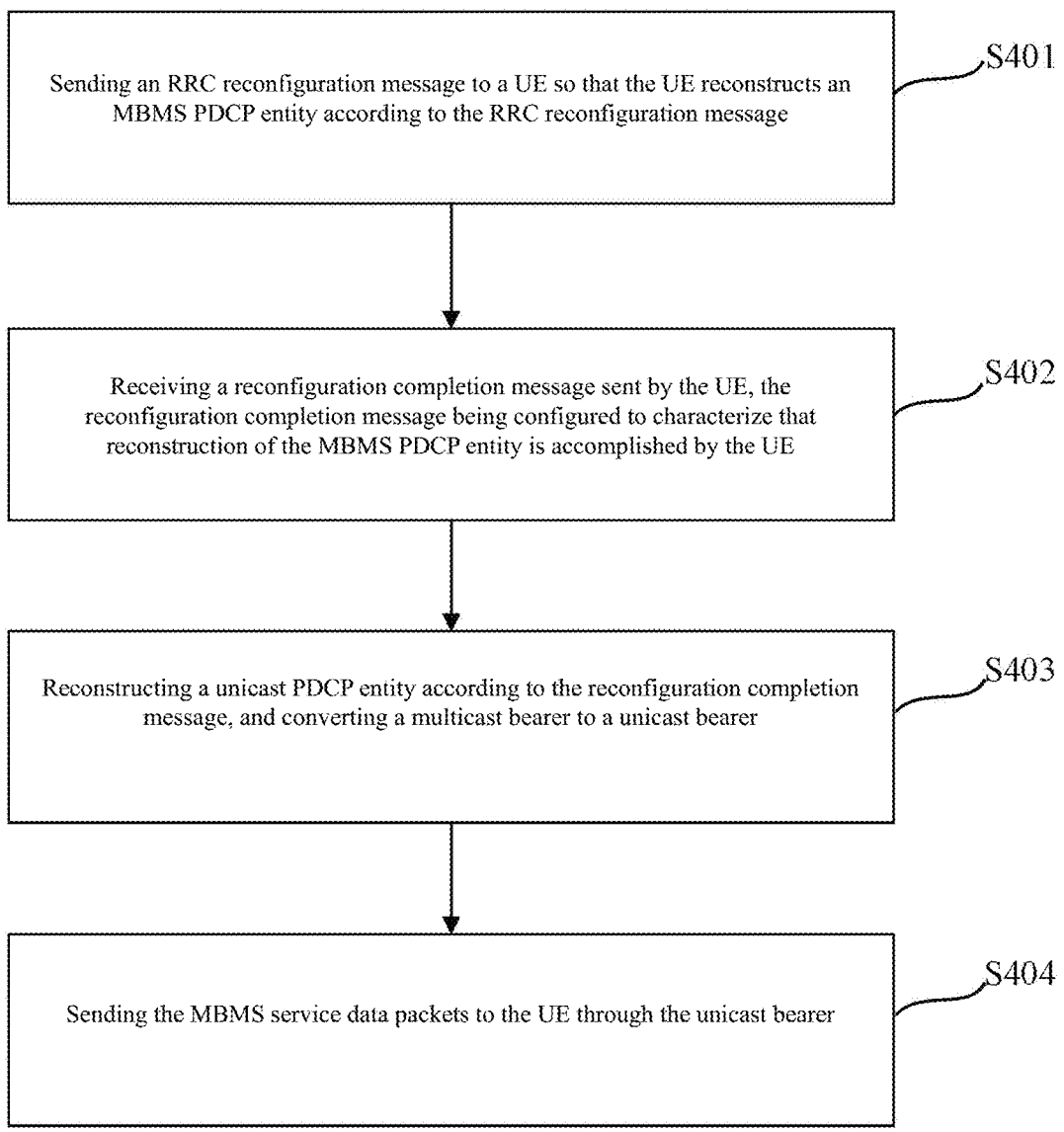
FIG. 5 is a schematic diagram of a flow of yet another unicast multicast conversion method according to an embodiment of the present application.

In an embodiment of the present application, there is provided yet another unicast multicast conversion method, applied to a third network node, and a schematic diagram of a flow of the method is shown in FIG. 5, the method comprises:

Step S401: Sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

Step S402: Receiving a reconfiguration completion message sent by the UE, the reconfiguration completion message is configured to characterize that reconstruction of the MBMS PDCP entity is accomplished by the UE.

Step S403: Reconstructing a unicast PDCP entity according to the reconfiguration completion message, and converting a multicast bearer to a unicast bearer.

Step S404: Sending the MBMS service data packets to the UE through the unicast bearer.

Optionally, before sending the RRC reconfiguration message to the UE, the method further comprises:
acquiring second information; and
determining to convert the multicast bearer to the unicast bearer based on the second information, the second information including at least one of the following: the number of UEs, bearer conditions of UEs, and reception status of the MBMS service data packets of UEs, the UE being a UE that receives the MBMS service data packet sent by the third network node.

The technical solution according to embodiments of the present application has at least the following beneficial effects:

When the UE switches from the second network node to the third network node, the UE is realized to convert from receiving the MBMS service data packets through the multicast bearer to receiving the MBMS service data packets through the unicast bearer, and to ensure that no data packets are lost, thereby improving the utilization efficiency of network resources.

The unicast multicast conversion methods of the above-mentioned embodiments of the present application are fully introduced in detail by the following embodiments.

A UE in the connected state is receiving a certain MBMS service data packet sent by the network node through the multicast bearer, e.g., SC-PTM mode, and when the network node determines that the UE received the MBMS service data packet through the unicast bearer, the UE achieves lossless transmission conversion of the MBMS service data packet by means of reconstructing the MBMS PDCP entity.

Optionally, after the UE received the RRC reconfiguration message, the UE will perform reconstruction of a downlink MBMS PDCP entity, wherein the RRC reconfiguration message includes a bearer conversion indication, and specifically includes:

(1) The UE is allowed to send a status report of multicast MBMS PDCP Protocol Data Units (PDUs) to the network node, where the status report is data packets not received.

(2) The UE performs a sorting operation on disordered Service Data Units (SDUs) of a multicast PDCP buffer, and new PDCP SDUs received on the unicast bearer of the network node.

Optionally, the order of the PDCP SDUs after the sorting operation is submitted to a high layer.

(3) Optionally, the UE uses a new unicast key and/or unicast compression algorithm to process the newly received PDCP SDUs.

Optionally, the network node reconstructs the unicast PDCP sending entity and retransmits the corresponding PDCP SDUs, based on the data packets reported by the UE that were not received.

Optionally, the network node uses the new unicast key and/or unicast compression algorithm to process the PDCP SDUs to be transmitted.

In one embodiment of the present application:

Point To Multipoint (PTM) is converted to Point To Point (PTP) within one network node, that is, the UE is converted from receiving the MBMS service data packets through the multicast bearer to receiving the MBMS service data packets through the unicast bearer within the one network node, the network node being the first network node.

The RRC reconfiguration message is configured in an individual manner, for example, the RRC reconfiguration message includes DRB configuration information or MRB configuration information; when the RRC reconfiguration message includes the DRB configuration information, the DRB corresponding to the DRB configuration information is in active state; when the RRC reconfiguration message includes the MRB configuration information, the MRB corresponding to the MRB configuration information is in active state.

Optionally, the first network node is a distributed unit (DU) in a base station, which DU corresponds to one cell; the PTM is converted to the PTP within one network node, that is, the PTM is converted to the PTP within the one cell.

Optionally, the first network node is one base station; the PTM is converted to the PTP within one network node, that is, the PTM is converted to the PTP within the one base station.

Step 0: A UE in the connected state is receiving a certain MBMS service data packet sent by the first network node through a multicast bearer, e.g., SC-PTM mode.

Step 1: The first network node determines that the UE is receiving the MBMS through a unicast bearer based on first information. The first information includes at least one of the following: a certain policy, some statistics, measurement information. The first information is, for example, the number of UEs currently receiving the MBMS service data packet under the first network node, or channel conditions of that particular UE, or reception status of the MBMS service data packet of the UE, etc.

Step 2: The first network node sends the RRC reconfiguration message to that particular UE.

Optionally, the RRC reconfiguration message comprises a bearer conversion indication.

Optionally, the RRC reconfiguration message will implicitly indicate to perform a bearer handover, e.g., from SC-PTM to PTP, by configuring only a configuration relationship of mapping from an MBS session (TMGI, Temporary Mobile Group Identity) to a Data Radio Bearer (DRB); or to carry explicit information, e.g., a conversion indication from the SC-PTM to the DRB, to indicate to perform the bearer handover.

Step 3: Upon receipt of the RRC reconfiguration message, the UE will perform reconstruction of the MBMS PDCP entity, specifically, including, but not limited to, the following steps:

the UE constructs data packets not received of multicast MBMS PDCP PDUs; and the UE stores disordered SDUs of a multicast PDCP buffer to a unicast PDCP buffer reconstructed.

Optionally, the UE applies a new unicast key and/or unicast compression algorithm to process new PDCP SDUs.

Step 4: Upon receipt of a reconfiguration completion message from the UE, the first network node will perform reconstruction of the unicast PDCP sending entity, specifically, including, but not limited to, the following steps:

The first network node reconstructs a unicast PDCP transmit entity and retransmits the corresponding PDCP SDUs to the UE according to the data packets not received included in the reconfiguration completion message reported by the UE; wherein the unicast PDCP entity includes the unicast PDCP transmit entity.

Optionally, the first network node uses the new unicast key and/or unicast compression algorithm to process the PDCP SDUs to be transmitted.

Step 5: The UE receives the MBMS service data packets through the unicast bearer.

The technical solution according to embodiments of the present application has at least the following beneficial effects:

Within the first network node, the UE is realized to convert from receiving the MBMS service data packets through the multicast bearer to receiving the MBMS service data packets through the unicast bearer, and to ensure that no data packets are lost, thereby improving the utilization efficiency of network resources.

In one embodiment of the present application:

Point To Multipoint (PTM) is converted to Point To Point (PTP) within one network node, that is, the UE is converted from receiving the MBMS service data packets through the multicast bearer to receiving the MBMS service data packets through the unicast bearer within the one network node, the network node being the first network node.

The RRC reconfiguration message is configured in a simultaneous configuration manner, for example, the RRC reconfiguration message includes DRB configuration information and MRB configuration information, the DRB corresponding to the DRB configuration information is in an active state, and the MRB corresponding to the MRB configuration information is in an inactive state. For another example, the RRC reconfiguration message includes DRB configuration information and MRB configuration information, the DRB corresponding to the DRB configuration information is in an inactive state, and the MRB corresponding to the MRB configuration information is in an active state.

Optionally, the first network node is a distributed unit (DU) in a base station, which DU corresponds to one cell; the PTM is converted to the PTP within one network node, that is, the PTM is converted to the PTP within the one cell.

Optionally, the first network node is one base station; the PTM is converted to the PTP within one network node, that is, the PTM is converted to the PTP within the one base station.

Step 0: For a UE receiving the MBMS service data packets in the connected state, the first network node configures the UE with both the DRB configuration information and the MRB configuration information, where for one MBMS session, the same SDAP layer will be shared, and the specific protocol stack is shown in FIG. 6.

Figure 6:
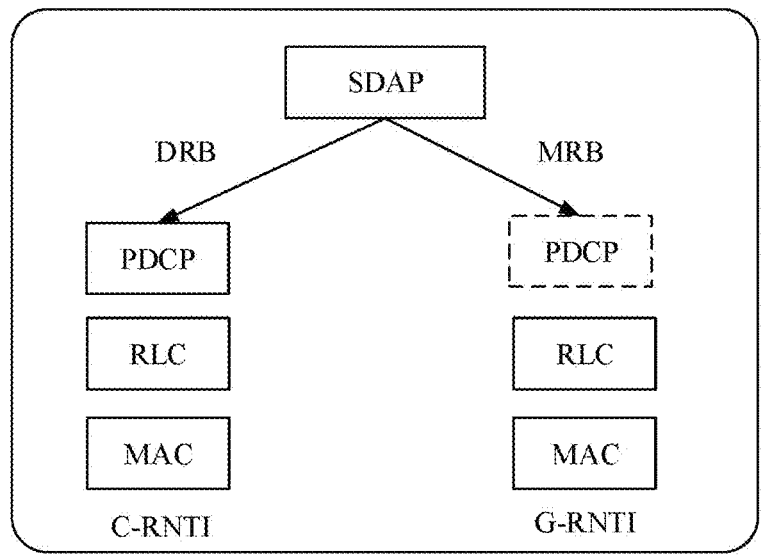
FIG. 6 is a user-plane protocol stack for sending MBMS service data packets on the network side according to an embodiment of the present application.

Optionally, the user-plane protocol stack for transmission of the MBMS service data packets of the network node is shown in FIG. 6. A Service Data Adaptation Protocol (SDAP), a Data Radio Bearer (DRB), a Multicast Radio Bearer (MRB), a Packet Data Convergence Protocol (PDCP), a Radio Link Control (RLC), Medium Access Control (MAC), a Cell-Radio Network Temporary Identifier (C-RNTI), and a Group-Radio Network Temporary Identity (G-RNTI) are included in FIG. 6.

The RRC reconfiguration message explicitly or implicitly specifies that, when the DRB corresponding to the current DRB configuration information is in an active state and the MRB corresponding to the MRB configuration information is in an inactive state, the UE performs the reception of MBMS service data packets.

Step 1: The first network node determines that the UE is receiving the MBMS through a unicast bearer based on first information. The first information includes at least one of the following: a certain policy, some statistics, measurement information. The first information is, for example, the number of UEs currently receiving the MBMS service data packet under the first network node, or channel conditions of that particular UE, or reception status of the MBMS service data packet of the UE, etc.

Step 2: The first network node sends the RRC reconfiguration message to that particular UE via an RRC message, PDCP control signaling, MAC CE or control signaling of a physical layer.

Optionally, the RRC reconfiguration message comprises a bearer conversion indication.

Optionally, the RRC reconfiguration message explicitly or implicitly specifies that reconstruction operation of the MBMS PDCP is required.

Step 3: Upon receipt of the RRC reconfiguration message, the UE will perform reconstruction of the MBMS PDCP entity, specifically, including, but not limited to, the following steps:

the UE constructs data packets not received of multicast MBMS PDCP PDUs; and the UE stores disordered SDUs of a multicast PDCP buffer to a unicast PDCP buffer reconstructed.

Optionally, the UE applies a new unicast key and/or unicast compression algorithm to process new PDCP SDUs.

Step 4: Upon receipt of a reconfiguration completion message from the UE, the first network node will perform reconstruction of the unicast PDCP sending entity, specifically, including, but not limited to, the following steps:

The first network node reconstructs a unicast PDCP transmit entity and retransmits the corresponding PDCP SDUs to the UE according to the data packets not received included in the reconfiguration completion message reported by the UE; wherein the unicast PDCP entity includes the unicast PDCP transmit entity.

Optionally, the first network node uses the new unicast key and/or unicast compression algorithm to process the PDCP SDUs to be transmitted.

Step 5: The UE receives the MBMS service data packets through the unicast bearer.

Within the first network node, the UE is realized to convert from receiving the MBMS service data packets through the multicast bearer to receiving the MBMS service data packets through the unicast bearer, and to ensure that no data packets are lost, thereby improving the utilization efficiency of network resources.

In one embodiment of the present application:

Point To Multipoint (PTM) is converted to Point To Point (PTP) between two network nodes, that is, the UE uses a multicast bearer to receive MBMS service data packets within the second network node, and when the UE switches from the second network node to the third network node, the UE is converted from receiving the MBMS service data packets through the multicast bearer to receiving the MBMS service data packets through the unicast bearer within the third network node.

The RRC reconfiguration message is configured in an individual manner, for example, the RRC reconfiguration message includes DRB configuration information or MRB configuration information; when the RRC reconfiguration message includes the DRB configuration information, the DRB corresponding to the DRB configuration information is in active state; when the RRC reconfiguration message includes the MRB configuration information, the MRB corresponding to the MRB configuration information is in active state.

Optionally, the second network node and the third network node are a distributed unit (DU) in the same base station respectively, wherein one DU corresponds to one cell; the PTM is converted to the PTP between the two network nodes, that is, the PTM is converted to the PTP between two different cells.

Optionally, the second network node and the third network node are different base stations; the PTM is converted to the PTP between the two network nodes, that is, the PTM is converted to the PTP between two different base stations.

Step 0: A UE in the connected state is receiving a certain MBMS service data packet in the second network node through a multicast bearer, e.g., MRB.

Step 1: When the UE switches from the second network node to the third network node, the third network node determines that the UE is receiving the MBMS via a unicast bearer based on second information. The second information includes at least one of the following: a certain policy, some statistics, measurement information. The second information is, for example, the number of UEs currently receiving the MBMS service data packet under the first network node, or channel conditions of that particular UE, or reception status of the MBMS service data packet of the UE, etc.

Step 2: The third network node sends the RRC reconfiguration message to that particular UE.

Optionally, the RRC reconfiguration message comprises a bearer conversion indication.

Optionally, the RRC reconfiguration message explicitly or implicitly specifies that reconstruction operation of the MBMS PDCP is required.

Step 3: Upon receipt of the RRC reconfiguration message, the UE will perform reconstruction of the MBMS PDCP entity, specifically, including, but not limited to, the following steps:

the UE constructs data packets not received of multicast MBMS PDCP PDUs; and the UE stores disordered SDUs of a multicast PDCP buffer to a unicast PDCP buffer reconstructed.

Optionally, the UE applies a new unicast key and/or unicast compression algorithm to process new PDCP SDUs.

Step 4: Upon receipt of a reconfiguration completion message from the UE, the third network node will perform reconstruction of the unicast PDCP sending entity, specifically, including, but not limited to, the following steps:

The third network node reconstructs a unicast PDCP transmit entity and retransmits the corresponding PDCP SDUs to the UE according to the data packets not received included in the reconfiguration completion message reported by the UE; wherein the unicast PDCP entity includes the unicast PDCP transmit entity.

Optionally, the third network node uses the new unicast key and/or unicast compression algorithm to process the PDCP SDUs to be transmitted.

Optionally, when the second network node and the third network node are different network nodes, a data forwarding mechanism between the second network node and the third network node is to be triggered.

Step 5: The UE receives the MBMS service data packets sent by the third network node through the unicast bearer.

The technical solution according to embodiments of the present application has at least the following beneficial effects:

When the UE switches from the second network node to the third network node, the UE is realized to convert from receiving the MBMS service data packets through the multicast bearer to receiving the MBMS service data packets through the unicast bearer, and to ensure that no data packets are lost, thereby improving the utilization efficiency of network resources.

In an embodiment of the present application:

Point To Multipoint (PTM) is converted to Point To Point (PTP) between two network nodes, that is, the UE uses a multicast bearer to receive MBMS service data packets within the second network node, and when the UE switches from the second network node to the third network node, the UE is converted from receiving the MBMS service data packets through the multicast bearer to receiving the MBMS service data packets through the unicast bearer within the third network node.

The RRC reconfiguration message is configured in a simultaneous configuration manner, for example, the RRC reconfiguration message includes DRB configuration information and MRB configuration information, the DRB corresponding to the DRB configuration information is in an active state, and the MRB corresponding to the MRB configuration information is in an inactive state. For another example, the RRC reconfiguration message includes DRB configuration information and MRB configuration information, the DRB corresponding to the DRB configuration information is in an inactive state, and the MRB corresponding to the MRB configuration information is in an active state.

Optionally, the second network node and the third network node are a distributed unit (DU) in the same base station respectively, wherein one DU corresponds to one cell; the PTM is converted to the PTP between the two network nodes, that is, the PTM is converted to the PTP between two different cells.

Optionally, the second network node and the third network node are different base stations; the PTM is converted to the PTP between the two network nodes, that is, the PTM is converted to the PTP between two different base stations.

Step 0: For a UE receiving the MBMS service data packets in the connected state, the second network node configures the UE with both the DRB configuration information and the MRB configuration information, where for one MBMS session, the same SDAP layer will be shared, and the specific protocol stack is shown in FIG. 6.

The RRC reconfiguration message explicitly or implicitly specifies that, when the DRB corresponding to the current DRB configuration information is in an active state and the MRB corresponding to the MRB configuration information is in an inactive state, the UE performs the reception of MBMS service data packets.

Step 1: When the UE switches from the second network node to the third network node, the third network node determines that the UE is receiving the MBMS via a unicast bearer based on second information. The second information includes at least one of the following: a certain policy, some statistics, measurement information. The second information is, for example, the number of UEs currently receiving the MBMS service data packet under the first network node, or channel conditions of that particular UE, or reception status of the MBMS service data packet of the UE, etc.

Step 2: The third network node sends the RRC reconfiguration message to that particular UE.

Optionally, the RRC reconfiguration message comprises a bearer conversion indication.

Optionally, the RRC reconfiguration message explicitly or implicitly specifies that reconstruction operation of the MBMS PDCP is required.

Step 3: Upon receipt of the RRC reconfiguration message, the UE will perform reconstruction of the MBMS PDCP entity, specifically, including, but not limited to, the following steps:

the UE constructs data packets not received of multicast MBMS PDCP PDUs; and the UE stores disordered SDUs of a multicast PDCP buffer to a unicast PDCP buffer reconstructed.

Optionally, the UE applies a new unicast key and/or unicast compression algorithm to process new PDCP SDUs.

Step 4: Upon receipt of a reconfiguration completion message from the UE, the third network node will perform reconstruction of the unicast PDCP sending entity, specifically, including, but not limited to, the following steps:

The third network node reconstructs a unicast PDCP transmit entity and retransmits the corresponding PDCP SDUs to the UE according to the data packets not received included in the reconfiguration completion message reported by the UE; wherein the unicast PDCP entity includes the unicast PDCP transmit entity.

Optionally, the third network node uses the new unicast key and/or unicast compression algorithm to process the PDCP SDUs to be transmitted.

Optionally, when the second network node and the third network node are different network nodes, a data forwarding mechanism between the second network node and the third network node is to be triggered.

Step 5: The UE receives the MBMS service data packets sent by the third network node through the unicast bearer.

The technical solution according to embodiments of the present application has at least the following beneficial effects:

When the UE switches from the second network node to the third network node, the UE is realized to convert from receiving the MBMS service data packets through the multicast bearer to receiving the MBMS service data packets through the unicast bearer, and to ensure that no data packets are lost, thereby improving the utilization efficiency of network resources.

Figure 7:
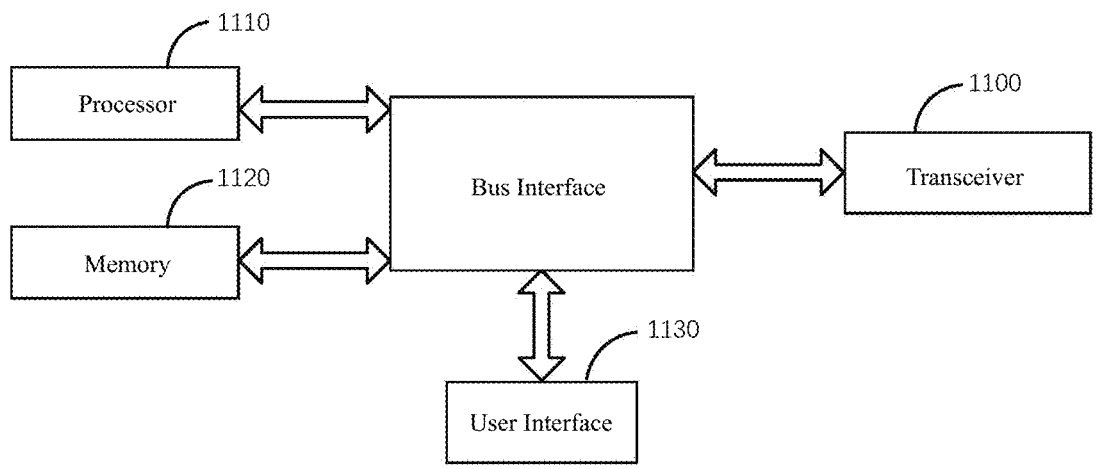
FIG. 7 is a schematic diagram of the structure of a unicast multicast conversion apparatus according to an embodiment of the present application.

Based on the same inventive concept, an embodiment of the present application also provides a unicast multicast conversion apparatus, applied to a User Equipment (UE), which apparatus has a schematic structure as shown in FIG. 7, wherein a transceiver 1100 is configured to receive and send data under the control of a processor 1110.

In FIG. 7, the bus architecture may include any number of interconnected buses and bridges, specifically various circuits of one or more processors represented by the processor 1110 and a memory represented by the memory 1120 are linked together. The bus architecture may also link together various other circuits such as peripherals, voltage regulators, and power management circuits, which are well known in the art and, therefore, will not be further described herein. The bus interface provides an interface. The transceiver 1100 may be a plurality of elements, i.e., including a transmitter and a receiver, providing units for communicating with various other apparatus over transmission media, which include transmission media such as wireless channels, wired channels, fiber optic cables, etc. For different user devices, the user interface 1130 can also be an interface capable of external and internal connection of the required devices, the connected devices include, but not limited to, keyboards, monitors, speakers, microphones, joysticks, etc.

The processor 1110 is responsible for managing the bus architecture and usual processing, and the memory 1120 may store the data used in performing actions by the processor 1110.

Optionally, the processor 1110 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor is configured by calling a computer program stored in the memory to execute the method described in the first aspect according to an embodiment of the present application in accordance with the obtained executable instructions. The processor and the memory may also be physically arranged separately.

The processor 1110 is configured to read the computer program in the memory 1120 and perform the following actions.

receiving a Radio Resource Control (RRC) reconfiguration message sent by a first network node, when Multimedia Broadcast Multicast Service (MBMS) service data packets sent by the first network node are received through a multicast bearer and the UE is in a connected state;

Reconstructing an MBMS Packet Data Convergence Protocol (MBMS PDCP) entity according to the RRC reconfiguration message;

sending a reconfiguration completion message to the first network node so that the first network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the first network node through the unicast bearer.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, reconstructing the MBMS PDCP entity according to the RRC reconfiguration message comprises:

constructing data packets that are not received by the UE of multicast PDCP Protocol Data Units (PDUs) according to the RRC reconfiguration message; and storing disordered Service Data Units (SDUs) of a multicast PDCP buffer to a unicast PDCP buffer reconstructed by the UE.

Optionally, when the MBMS service data packets sent by the first network node that are received through the unicast bearer include the corresponding PDCP PDUs, the method further comprises:

processing, via a unicast key and/or a unicast compression mode, the PDCP PDUs corresponding to the MBMS service data packets sent by the first network node through the unicast bearer to obtain the PDCP SDUs.

Optionally, the RRC reconfiguration message includes a bearer conversion indication, which is configured to implicitly indicate to perform the conversion of the multicast bearer to the unicast bearer by configuring a configuration relationship of mapping from an MBMS session to the DRB, or to carry explicit information indicating to perform the conversion of the multicast bearer to the unicast bearer.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 8:
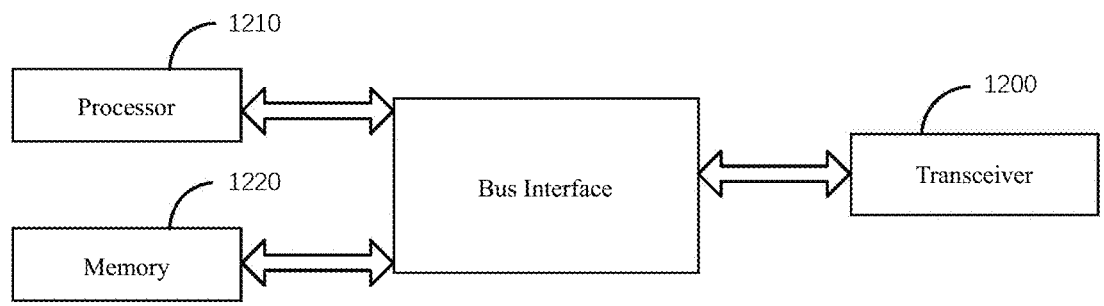
FIG. 8 is a schematic diagram of the structure of a unicast multicast conversion apparatus according to an embodiment of the present application.

Based on the same inventive concept, an embodiment of the present application also provides a unicast multicast conversion apparatus, applied to a first network node, which apparatus has a schematic structure as shown in FIG. 8, wherein a transceiver 1200 is configured to receive and send data under the control of a processor 1210.

In FIG. 8, the bus architecture may include any number of interconnected buses and bridges, specifically various circuits of one or more processors represented by the processor 1210 and a memory represented by the memory 1220 are linked together. The bus architecture may also link together various other circuits such as peripherals, voltage regulators, and power management circuits, which are well known in the art and, therefore, will not be further described herein. The bus interface provides an interface. The transceiver 1200 may be a plurality of elements, i.e., including a transmitter and a receiver, providing units for communicating with various other apparatus over transmission media, which include transmission media such as wireless channels, wired channels, fiber optic cables, etc. The processor 1210 is responsible for managing the bus architecture and usual processing, and the memory 1220 may store the data used in performing actions by the processor 1210.

The processor 1210 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor 1210 is configured to read the computer program in the memory and perform the following actions:

sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

Optionally, the reconfiguration completion message includes data packets that not received by the UE.

Optionally, before sending the MBMS service data packets to the UE through the unicast bearer, the method further comprises:

processing, via a unicast key and/or a unicast compression mode, PDCP Service Data Units (SDUs) corresponding to the MBMS service data packets sent through the unicast bearer to obtain PDCP Protocol Data Units (PDUs);

the sending the MBMS service data packets to the UE through the unicast bearer comprises:

sending the PDCP PDUs to the UE through the unicast bearer.

Optionally, sending the RRC reconfiguration message to the UE includes at least one of the following:

sending the RRC reconfiguration message to the UE via an RRC signaling;

sending the RRC reconfiguration message to the UE via a PDCP control signaling;

sending the RRC reconfiguration message to the UE via a Media Access Control Control Element (MAC CE); and sending the RRC reconfiguration message to the UE via a control signaling of a physical layer;

wherein the RRC reconfiguration message comprises a bearer conversion indication.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 9:
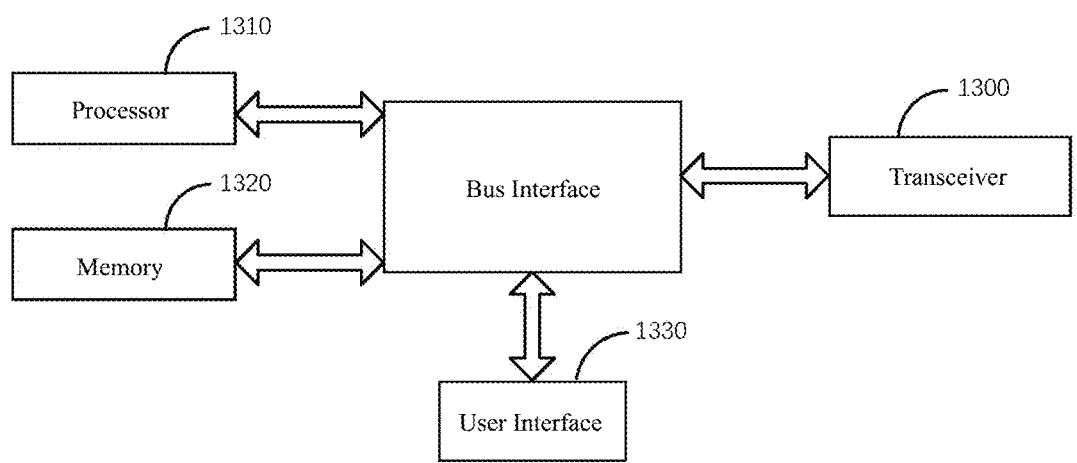
FIG. 9 is a schematic diagram of the structure of a unicast multicast conversion apparatus according to an embodiment of the present application.

Based on the same inventive concept, an embodiment of the present application also provides a unicast multicast conversion apparatus, applied to a User Equipment (UE), which apparatus has a schematic structure as shown in FIG. 9, wherein a transceiver 1300 is configured to receive and send data under the control of a processor 1310.

In FIG. 9, the bus architecture may include any number of interconnected buses and bridges, specifically various circuits of one or more processors represented by the processor 1310 and a memory represented by the memory 1320 are linked together. The bus architecture may also link together various other circuits such as peripherals, voltage regulators, and power management circuits, which are well known in the art and, therefore, will not be further described herein. The bus interface provides an interface. The transceiver 1300 may be a plurality of elements, i.e., including a transmitter and a receiver, providing units for communicating with various other apparatus over transmission media, which include transmission media such as wireless channels, wired channels, fiber optic cables, etc. For different user devices, the user interface 1330 can also be an interface capable of external and internal connection of the required devices, the connected devices include, but not limited to, keyboards, monitors, speakers, microphones, joysticks, etc.

The processor 1310 is responsible for managing the bus architecture and usual processing, and the memory 1320 may store the data used in performing actions by the processor 1310.

Optionally, the processor 1310 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor is configured by calling a computer program stored in the memory to execute the method described in the third aspect according to an embodiment of the present application in accordance with the obtained executable instructions. The processor and the memory may also be physically arranged separately.

The processor 1310 is configured to read the computer program in the memory 1320 and perform the following actions.
  switching from a second network node to a third network node, when Multimedia are received through a multicast bearer and the UE is in a connected state;
  receiving an RRC reconfiguration message sent by the third network node;
  reconstructing an MBMS Packet Data Convergence Protocol (MBMS PDCP) entity according to the RRC reconfiguration message;
  sending a reconfiguration completion message to the third network node so that the third network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and
  receiving the MBMS service data packets sent by the third network node through the unicast bearer.

Optionally, the configuration of the RRC reconfiguration message includes at least one of the following:
  the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;
  the RRC reconfiguration message includes DRB configuration information and MRB configuration information, the DRB corresponding to the DRB configuration information is in an active state, and the MRB corresponding to the MRB configuration information is in an inactive state; and
  the RRC reconfiguration message includes DRB configuration information and MRB configuration information, the DRB corresponding to the DRB configuration information is in an inactive state, and the MRB corresponding to the MRB configuration information is in an active state.

Optionally, the second network node and the third network node are at least one Distributed Unit (DU) in the same base station respectively, and the at least one DU corresponds to at least one cell; or the second network node and the third network node are different base stations.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 10:
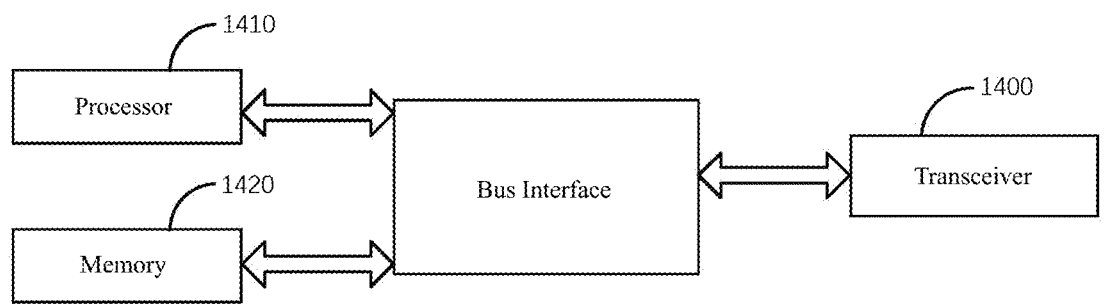
FIG. 10 is a schematic diagram of the structure of a unicast multicast conversion apparatus according to an embodiment of the present application.

Based on the same inventive concept, an embodiment of the present application also provides a unicast multicast conversion apparatus, applied to a third network node, which apparatus has a schematic structure as shown in FIG. 10, wherein a transceiver 1400 is configured to receive and send data under the control of a processor 1410.

In FIG. 10, the bus architecture may include any number of interconnected buses and bridges, specifically various circuits of one or more processors represented by the processor 1410 and a memory represented by the memory 1420 are linked together. The bus architecture may also link together various other circuits such as peripherals, voltage regulators, and power management circuits, which are well known in the art and, therefore, will not be further described herein. The bus interface provides an interface. The transceiver 1400 may be a plurality of elements, i.e., including a transmitter and a receiver, providing units for communicating with various other apparatus over transmission media, which include transmission media such as wireless channels, wired channels, fiber optic cables, etc. The processor 1410 is responsible for managing the bus architecture and usual processing, and the memory 1420 may store the data used in performing actions by the processor 1410.

The processor 1410 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor 1410 is configured to read the computer program in the memory and perform the following actions:
  sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;
  receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message, and converting a multicast bearer to a unicast bearer; and sending MBMS service data packets to the UE through the unicast bearer.

Optionally, before the sending the RRC reconfiguration message to the UE, the method further comprises:

acquiring a second information; and determining to convert the multicast bearer to the unicast bearer based on the second information, the second information including at least one of the following: the number of UEs, bearer conditions of UEs, and reception status of the MBMS service data packets of UEs, the UE being a UE that receives the MBMS service data packet sent by the third network node.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 11:
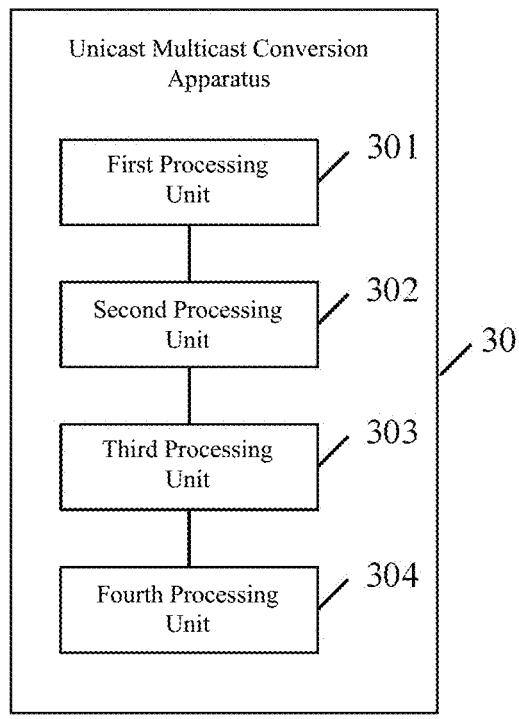
FIG. 11 is a schematic diagram of the structure of a unicast multicast conversion apparatus according to an embodiment of the present application.

Based on the same inventive concept of the aforementioned embodiments, an embodiment of the present application also provides a unicast multicast conversion apparatus, applied to a User Equipment (UE), which apparatus has a schematic structure as shown in FIG. 11, and the unicast multicast conversion apparatus 30 includes a first processing unit 301, a second processing unit 302, a third processing unit 303, and a fourth processing unit 304.

The first processing unit 301 is configured to receive a Radio Resource Control (RRC) reconfiguration message sent by a first network node, when Multimedia Broadcast Multicast Service (MBMS) service data packets sent by the first network node are received through a multicast bearer and the UE is in a connected state.

The second processing unit 302 is configured to reconstruct an MBMS Packet Data Convergence Protocol (MBMS PDCP) entity according to the RRC reconfiguration message.

The third processing unit 303 is configured to send a reconfiguration completion message to the first network node so that the first network node converts the multicast bearer to a unicast bearer, and sends the MBMS service data packets to the UE through the unicast bearer, the reconfiguration completion message being configured to characterize that reconstruction of the MBMS PDCP entity is accomplished by the UE.

The fourth processing unit 304 is configured to receive the MBMS service data packets sent by the first network node through the unicast bearer.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, the second processing unit 302 is configured to construct data packets of a multicast PDCP PDU buffer that are not received by the UE according to the RRC reconfiguration message; and to store disordered Service Data Units (SDUs) of the multicast PDCP buffer to a unicast PDCP buffer reconstructed by the UE.

Optionally, when the MBMS service data packets sent by the first network node that are received through the unicast bearer include the corresponding PDCP PDUs, the method further comprises:

processing, via a unicast key and/or a unicast compression mode, the PDCP PDUs corresponding to the MBMS service data packets sent by the first network node through the unicast bearer to obtain the PDCP SDUs.

Optionally, the RRC reconfiguration message includes a bearer conversion indication, which is configured to implicitly indicate to perform the conversion of the multicast bearer to the unicast bearer by configuring a configuration relationship of mapping from an MBMS session to the DRB, or to carry explicit information indicating to perform the conversion of the multicast bearer to the unicast bearer.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 12:
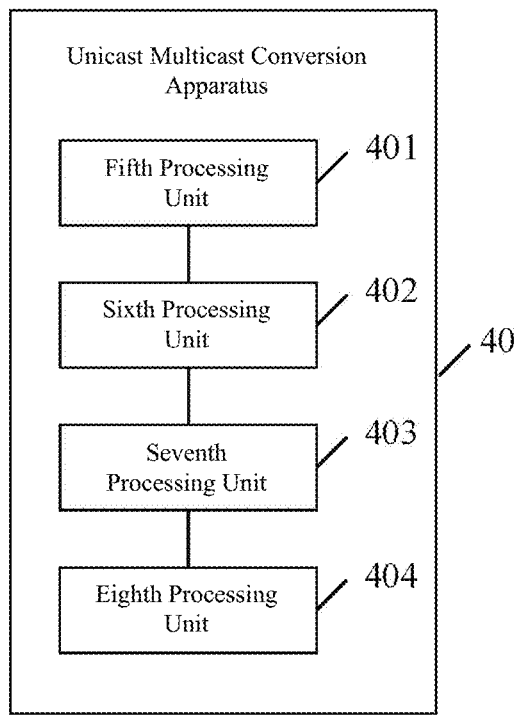
FIG. 12 is a schematic diagram of the structure of a unicast multicast conversion apparatus according to an embodiment of the present application.

Based on the same inventive concept of the aforementioned embodiments, an embodiment of the present application also provides a unicast multicast conversion apparatus, applied to a first network node, which apparatus has a schematic structure as shown in FIG. 12, and the unicast multicast conversion apparatus 40 includes a fifth processing unit 401, a sixth processing unit 402, a seventh processing unit 403, and an eighth processing unit 404.

The fifth processing unit 401 is configured to send a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message.

The sixth processing unit 402 is configured to receive a reconfiguration completion message sent by the UE, the reconfiguration completion message being configured to characterize that reconstruction of the MBMS PDCP entity is accomplished by the UE.

The seventh processing unit 403 is configured to reconstruct a unicast PDCP entity according to the reconfiguration completion message, and to convert a multicast bearer to a unicast bearer.

The eighth processing unit 404 is configured to send the MBMS service data packets to the UE through the unicast bearer.

Optionally, before sending the RRC reconfiguration message to the UE, the method further comprises:

acquiring first information; and determining to convert the multicast bearer to the unicast bearer based on the first information, the first information including at least one of the following: the number of UEs, bearer conditions of UEs, and reception status of the MBMS service data packets of UEs, the UE being a UE that receives the MBMS service data packet sent by the first network node.

Optionally, the reconfiguration completion message includes data packets that not received by the UE.

Optionally, before the sending the MBMS service data packets to the UE through the unicast bearer, the method further comprises:

processing, via a unicast key and/or a unicast compression mode, PDCP Service Data Units (SDUs) corresponding to the MBMS service data packets sent through the unicast bearer to obtain PDCP Protocol Data Units (PDUs);

the sending the MBMS service data packets to the UE through the unicast bearer comprises:

sending the PDCP PDUs to the UE through the unicast bearer.

Optionally, sending the RRC reconfiguration message to the UE includes at least one of the following:

sending the RRC reconfiguration message to the UE via a RRC signaling;

sending the RRC reconfiguration message to the UE via a PDCP control signaling;

sending the RRC reconfiguration message to the UE via a Media Access Control Control Element (MAC CE); and sending the RRC reconfiguration message to the UE via a control signaling of a physical layer;

wherein the RRC reconfiguration message comprises a bearer conversion indication.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 13:
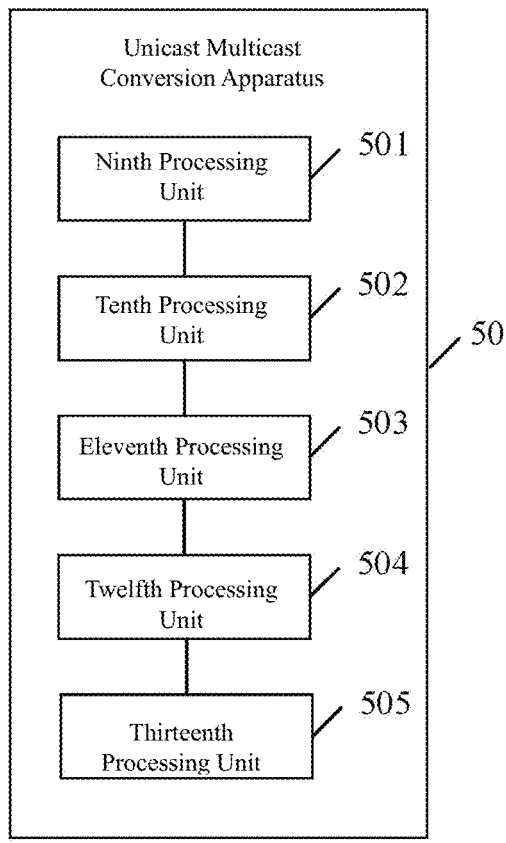
FIG. 13 is a schematic diagram of the structure of a unicast multicast conversion apparatus according to an embodiment of the present application.

Based on the same inventive concept of the aforementioned embodiments, an embodiment of the present application also provides a unicast multicast conversion apparatus, applied to a User Equipment (UE), which apparatus has a schematic structure as shown in FIG. 13, and the unicast multicast conversion apparatus 50 includes a ninth processing unit 501, a tenth processing unit 502, an eleventh processing unit 503, a twelfth processing unit 504, and a thirteenth processing unit 505.

The ninth processing unit 501 is configured to switch from a second network node to a third network node, when Multimedia Broadcast Multicast Service (MBMS) service data packets sent by the second network node are received through a multicast bearer and the UE is in a connected state.

The tenth processing unit 502 is configured to receive a Radio Resource Control (RRC) reconfiguration message sent by the third network node.

The eleventh processing unit 503 is configured to reconstruct an MBMS Packet Data Convergence Protocol (MBMS PDCP) entity according to the RRC reconfiguration message.

The twelfth processing unit 504 is configured to send a reconfiguration completion message to the third network node so that the third network node converts the multicast bearer to a unicast bearer, and sends the MBMS service data packets to the UE through the unicast bearer, the reconfiguration completion message being configured to characterize that reconstruction of the MBMS PDCP entity is accomplished by the UE.

The thirteenth processing unit 505 is configured to receive the MBMS service data packets sent by the third network node through the unicast bearer.

Optionally, the configuration of the RRC reconfiguration message includes at least one of the following:

the RRC reconfiguration message includes Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message includes DRB configuration information and MRB configuration information, the DRB corresponding to the DRB configuration information is in an active state, and the MRB corresponding to the MRB configuration information is in an inactive state; and the RRC reconfiguration message includes DRB configuration information and MRB configuration information, the DRB corresponding to the DRB configuration information is in an inactive state, and the MRB corresponding to the MRB configuration information is in an active state.

Optionally, the second network node and the third network node are at least one Distributed Unit (DU) in the same base station respectively, and the at least one DU corresponds to at least one cell; or the second network node and the third network node are different base stations.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

Figure 14:
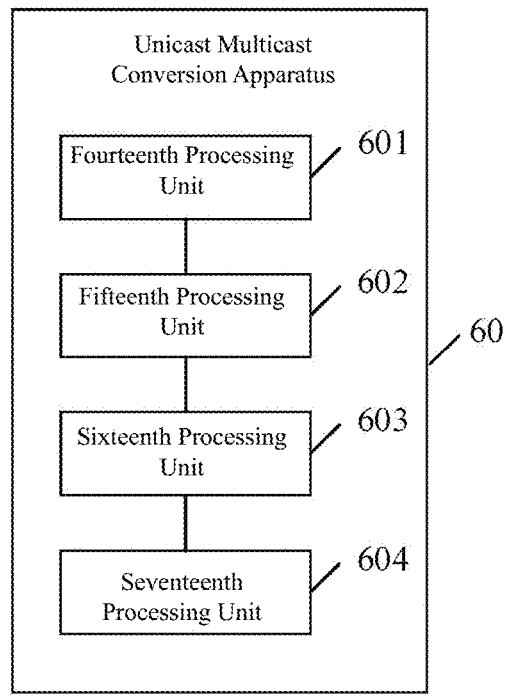
FIG. 14 is a schematic diagram of the structure of a unicast multicast conversion apparatus according to an embodiment of the present application.

Based on the same inventive concept of the aforementioned embodiments, an embodiment of the present application also provides a unicast multicast conversion apparatus, applied to a third network node, which apparatus has a schematic structure as shown in FIG. 14, and the unicast multicast conversion apparatus 60 includes a fourteenth processing unit 601, a fifteenth processing unit 602, a sixteenth processing unit 603, and a seventeenth processing unit 604.

The fourteenth processing unit 601 is configured to send a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message.

The fifteenth processing unit 602 is configured to receive a reconfiguration completion message sent by the UE, the reconfiguration completion message being configured to characterize that reconstruction of the MBMS PDCP entity is accomplished by the UE.

The sixteenth processing unit 603 is configured to reconstruct a unicast PDCP entity according to the reconfiguration completion message, and to convert a multicast bearer to a unicast bearer.

The seventeenth processing unit 604 configured to send the MBMS service data packets to the UE through the unicast bearer.

Optionally, before sending the RRC reconfiguration message to the UE, the method further comprises:

acquiring second information; and determining to convert the multicast bearer to the unicast bearer based on the second information, the second information including at least one of the following: the number of UEs, bearer conditions of UEs, and reception status of the MBMS service data packets of UEs, the UE being a UE that receives the MBMS service data packet sent by the third network node.

It should be noted here that the above apparatus according to embodiments of the present invention can achieve all method steps implemented in embodiments of the above method, and can achieve the same technical effects, and the same parts and beneficial effects in the present embodiment as the method embodiment will not be specifically detailed herein.

It should be noted that the dividing of the units in embodiments of the present application is schematic and is only a logical functional division, and there may be other dividing ways in actual implementations. In addition, respective functional units in various embodiments of the present application may be integrated in one processing unit, or each unit may be physically present separately, or two or more units may be integrated in one unit. The above integrated units may be implemented in the form of hardware, and also may be implemented in the form of software functional units.

Said integrated units may be stored in one processor-readable storage medium when implemented in the form of software functional units and sold or used as a separate product. Based on such understanding, the technical solution of the present application, or part that contributes to the prior art, or all or part of the technical solution, essentially may be embodied in the form of a software product stored in a storage medium and including serval instructions to cause a computer device (which may be a personal computer, server, or network device, etc.) or processor to perform all or some of the steps of the method described in various embodiments of the present application. The aforementioned storage media include various media that may store program code, such as a USB flash drive, mobile hard disk, read-only memory (ROM), random access memory (RAM), disk or CD-ROM.

Based on the same inventive concept, an embodiment of the present application also provides a processor-readable storage medium storing a computer program that is used to embody any of the steps of any one of the unicast multicast conversion methods according to any of the embodiments of the present application or any optional implementation when executed by a processor.

The processor-readable storage medium may be any available medium or data storage device accessible by the processor, including but not limited to magnetic memory (e.g., floppy disk, hard disk, magnetic tape, magnetic optical disk (MO), etc.), optical memory (e.g., CD, DVD, BD, HVD, etc.), and semiconductor memory (e.g., ROM, EPROM, EEPROM, non-volatile memory (NAND FLASH), solid state drive (SSD)), and so on.

Those skilled in the art should understand that embodiments of the present application may be provided as methods, systems, or computer program products. Accordingly, the present application may take the form of a full hardware embodiment, a full software embodiment, or an embodiment combining software and hardware aspects. Further, the present application may take the form of a computer program product implemented on one or more computer usable storage media (including, but not limited to, disk memory and optical memory, etc.) containing computer usable program code therein.

The present application is described with reference to flowcharts and/or block diagrams of methods, devices (systems), and computer program products according to embodiments of the present application. It is to be understood that each process and/or block in the flowchart and/or block diagram, and the combination of processes and/or blocks in the flowchart and/or block diagram, may be implemented by computer-executable instructions. These computer-executable instructions may be provided to a processor of a general-purpose computer, a specialized computer, an embedded machine, or other programmable data processing device to produce a machine, such that instructions executed by the processor of the computer or other programmable data processing device produce a means for implementing a function specified in one or more processes of the flowchart and/or one or more blocks of the block diagram.

These processor-executable instructions may also be stored in a processor-readable memory capable of directing the computer or other programmable data processing device to operate in a particular manner such that the instructions stored in the processor-readable memory produce an article of manufacture including an instruction means that implements the function specified in one or more processes of the flowcharts and/or one or more blocks of the block diagrams.

These processor-executable instructions may also be loaded onto a computer or other programmable data processing device such that a series of operational steps are performed on the computer or other programmable device to produce computer-implemented processing such that the instructions executed on the computer or other programmable device provide steps for implementing the function specified in one or more processes of the flowcharts and/or one or more blocks of the block diagrams.

Obviously, those skilled in the art may make various modifications and variations of the present application without departing from the spirit and scope of the present application. Thus, if these modifications and variations of the present application fall within the scope of the claims of the present application and its equivalent technology, then the present application is also intended to include them.

What is claimed is:

1. A unicast multicast conversion method, applied to a User Equipment (UE), comprising:
receiving a Radio Resource Control (RRC) reconfiguration message sent by a first network node, when Multimedia Broadcast Multicast Service (MBMS) service data packets sent by the first network node are received through a multicast bearer and the UE is in a connected state;
reconstructing a Multimedia Broadcast Multicast Service Packet Data Convergence Protocol (MBMS PDCP) entity according to the RRC reconfiguration message;
sending a reconfiguration completion message to the first network node so that the first network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and
receiving the MBMS service data packets sent by the first network node through the unicast bearer.

2. The method of claim 1, wherein the configuration mode of the RRC reconfiguration message comprises at least one of the following:
the RRC reconfiguration message comprising Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message comprising DRB configuration information and MRB configuration information, the DRB corresponding to the DRB configuration information is in an active state, and the MRB corresponding to the MRB configuration information is in an inactive state; and the RRC reconfiguration message comprising DRB configuration information and MRB configuration information, the DRB corresponding to the DRB configuration information is in an inactive state, and the MRB corresponding to the MRB configuration information is in an active state.

3. The method of claim 1, wherein reconstructing the MBMS PDCP entity according to the RRC reconfiguration message comprises:

constructing data packets of multicast PDCP Protocol Data Units (PDUs) that are not received by the UE according to the RRC reconfiguration message; and storing disordered Service Data Units (SDUs) of a multicast PDCP buffer to a unicast PDCP buffer reconstructed by the UE.

4. The method of claim 1, wherein, when the MBMS service data packets sent by the first network node received through the unicast bearer include the corresponding PDCP PDUs, the method further comprises:

processing, via a unicast key and/or a unicast compression mode, the PDCP PDUs corresponding to the MBMS service data packets sent by the first network node through the unicast bearer to obtain the PDCP SDUs.

5. The method of claim 1, wherein the RRC reconfiguration message comprises a bearer conversion indication, which is configured to implicitly indicate to perform a conversion of the multicast bearer to the unicast bearer by configuring a configuration relationship of mapping from an MBMS session to the DRB, or to carry explicit information indicating to perform a conversion of the multicast bearer to the unicast bearer.

6. A unicast multicast conversion method, applied to a first network node, comprising:

sending a Radio Resource Control (RRC) reconfiguration message to a User Equipment (UE), so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message and converting a multicast bearer to a unicast bearer; and sending MBMS service data packets to the UE through the unicast bearer.

7. The method of claim 6, wherein, before sending the RRC reconfiguration message to the UE, the method further comprises:

acquiring first information; and determining to convert the multicast bearer to the unicast bearer based on the first information, wherein the first information comprises at least one of the number of UEs, bearer conditions of UEs, or reception status of the MBMS service data packets of UEs, the UE being a UE that receives the MBMS service data packet sent by the first network node.

8. The method of claim 6, wherein the reconfiguration completion message comprises data packets that are not received by the UE.

9. The method of claim 6, wherein, before sending the MBMS service data packets to the UE through the unicast bearer, the method further comprises:

processing, via a unicast key and/or a unicast compression mode, PDCP Service Data Units (SDUs) corresponding to the MBMS service data packets sent through the unicast bearer to obtain PDCP Protocol Data Units (PDUs);

wherein sending the MBMS service data packets to the UE through the unicast bearer comprises:

sending the PDCP PDUs to the UE through the unicast bearer.

10. The method of claim 6, wherein sending the RRC reconfiguration message to the UE comprises at least one of the following:

sending the RRC reconfiguration message to the UE via an RRC signaling;

sending the RRC reconfiguration message to the UE via a Packet Data Convergence Protocol (PDCP) control signaling;

sending the RRC reconfiguration message to the UE via a Media Access Control Control Element (MAC CE); and sending the RRC reconfiguration message to the UE via a control signaling of a physical layer;

wherein the RRC reconfiguration message comprises a bearer conversion indication.

11. A unicast multicast conversion method, applied to a User Equipment (UE), comprising:

switching from a second network node to a third network node, when Multimedia Broadcast Multicast Service (MBMS) service data packets sent by the second network node are received through a multicast bearer and the UE is in a connected state;

receiving, from the third network node, a Radio Resource Control (RRC) reconfiguration message;

reconstructing an MBMS Packet Data Convergence Protocol (MBMS PDCP) entity according to the RRC reconfiguration message;

sending a reconfiguration completion message to the third network node so that the third network node converts the multicast bearer to a unicast bearer and sends the MBMS service data packets to the UE through the unicast bearer, the reconfiguration completion message being configured to characterize that reconstruction of the MBMS PDCP entity is accomplished by the UE; and receiving the MBMS service data packets sent by the third network node through the unicast bearer.

12. The method of claim 11, wherein the configuration of the RRC reconfiguration message comprises at least one of the following:

the RRC reconfiguration message comprising Data Radio Bearer (DRB) configuration information or Multicast Radio Bearer (MRB) configuration information, the DRB corresponding to the DRB configuration information is in an active state, and the MRB corresponding to the MRB configuration information is in an active state;

the RRC reconfiguration message comprising DRB configuration information and MRB configuration information, the DRB corresponding to the DRB configuration information is in an active state, and the MRB corresponding to the MRB configuration information is in an inactive state; and the RRC reconfiguration message comprising DRB configuration information and MRB configuration information, the DRB corresponding to the DRB configuration information is in an inactive state, and the MRB corresponding to the MRB configuration information is in an active state.

13. The method of claim 11, wherein the second network node and the third network node are at least one Distributed Unit (DU) in the same base station respectively, the at least one DU corresponds to at least one cell; or the second network node and the third network node are different base stations.

14. A unicast multicast conversion method, applied to a third network node, comprising:

sending a Radio Resource Control (RRC) reconfiguration message to a User Equipment (UE) so that the UE reconstructs a Multimedia Broadcast Multicast Service Packet Data Convergence Protocol (MBMS PDCP) entity according to the RRC reconfiguration message;

receiving a reconfiguration completion message sent by the UE, the reconfiguration completion message being configured to characterize that reconstruction of the MBMS PDCP entity is accomplished by the UE;

reconstructing a unicast PDCP entity according to the reconfiguration completion message and converting a multicast bearer to a unicast bearer; and sending MBMS service data packets to the UE through the unicast bearer.

15. The method of claim 14, wherein, before sending the RRC reconfiguration message to the UE, the method further comprises:

acquiring second information; and determining to convert the multicast bearer to the unicast bearer based on the second information, the second information including at least one of the number of UEs, bearer conditions of UEs, or reception status of the MBMS service data packets of UEs, wherein the UE is a UE that receives the MBMS service data packet sent by the third network node.

16. A unicast multicast conversion apparatus, applied to a UE, comprising a memory, a transceiver, and a processor:

the memory is configured to store a computer program; the transceiver is configured to send and receive data under the control of the processor; the processor is configured to read the computer program in the memory and perform the method of claim 1.

17. A unicast multicast conversion apparatus, applied to a first network node, comprising a memory, a transceiver, and a processor:

the memory is configured to store a computer program; the transceiver is configured to send and receive data under the control of the processor; the processor is configured to read the computer program in the memory and perform the method of claim 6.

18. A unicast multicast conversion apparatus, applied to a UE, comprising a memory, a transceiver, and a processor:

the memory is configured to store a computer program; the transceiver is configured to send and receive data under the control of the processor; the processor is configured to read the computer program in the memory and perform method of claim 11.

19. A unicast multicast conversion apparatus, applied to a third network node, comprising a memory, a transceiver, and a processor:

the memory is configured to store a computer program; the transceiver is configured to send and receive data under the control of the processor; the processor is configured to read the computer program in the memory and perform the method of claim 14.

20. A non-transitory processor-readable storage medium, having stored therein a computer program that, when executed by a processor, causes the processor to perform the method of claim 1.

21. A non-transitory processor-readable storage medium, having stored therein a computer program that, when executed by a processor, causes the processor to perform the method of claim 6.

22. A non-transitory processor-readable storage medium, having stored therein a computer program that, when executed by a processor, causes the processor to perform the method of claim 11.

23. A non-transitory processor-readable storage medium, having stored therein a computer program that, when executed by a processor, causes the processor to perform the method of claim 14.

* * * * *